(12) United States Patent
Wittebrood et al.

(10) Patent No.: US 7,519,230 B2
(45) Date of Patent: Apr. 14, 2009

(54) BACKGROUND MOTION VECTOR DETECTION

(75) Inventors: Rimmert B. Wittebrood, Eindhoven (NL); Gerard De Haan, Eindhoven (NL); Rogier Lodder, Eindhoven (NL)

(73) Assignee: NXP B.V., Eindhoven (NL)

( * ) Notice: Subject to any disclaimer, the term of this patent is extended or adjusted under 35 U.S.C. 154(b) by 685 days.

(21) Appl. No.: 10/542,893

(22) PCT Filed: Dec. 16, 2003

(86) PCT No.: PCT/IB03/06182

§ 371 (c)(1),
(2), (4) Date: Jul. 20, 2005

(87) PCT Pub. No.: WO2004/066624

PCT Pub. Date: Aug. 5, 2004

(65) Prior Publication Data

US 2006/0072790 A1    Apr. 6, 2006

(30) Foreign Application Priority Data

Jan. 23, 2003    (EP) ................... 03100134

(51) Int. Cl.
*G06K 9/36* (2006.01)

(52) U.S. Cl. .................. 382/236; 382/232; 382/250; 382/253; 375/240.16; 348/402.1; 348/416.1

(58) Field of Classification Search ................. 382/236, 382/232, 250, 251, 253; 375/240.16; 348/402.1, 348/413.1, 416.1
See application file for complete search history.

(56) References Cited

U.S. PATENT DOCUMENTS

| | | | |
|---|---|---|---|
| 6,005,639 A * | 12/1999 | Thomas et al. | 348/699 |
| 6,219,436 B1 * | 4/2001 | De Haan et al. | 382/107 |
| 6,278,736 B1 | 8/2001 | De Haan et al. | |
| 6,954,498 B1 * | 10/2005 | Lipton | 375/240.08 |
| 2002/0154695 A1 * | 10/2002 | Cornog et al. | 375/240.16 |
| 2004/0252763 A1 * | 12/2004 | Mertens | 375/240.16 |

OTHER PUBLICATIONS

Gerard De Haan: Video Processing for Multimedia Systems, University Press Eindhoven, 2000, Chapter 4, pp. 103-147.

* cited by examiner

*Primary Examiner*—Matthew C Bella
*Assistant Examiner*—Ali Bayat
(74) *Attorney, Agent, or Firm*—Aaron Waxler

(57) ABSTRACT

A selector (502) for selecting a background motion vector for a pixel in an occlusion region of an image, from a set of motion vectors being computed for the image, comprises: computing means (510) for computing a model-based motion vector for the pixel on basis of a motion model being determined on basis of a part of (402-436) a motion vector field (400) of the image; comparing means (511) for comparing the model-based motion vector with each of the motion vectors of the set of motion vectors; and selecting means (512) for selecting a particular motion vector of the set of motion vectors on basis of the comparing and for assigning the particular motion vector as the background motion vector.

6 Claims, 7 Drawing Sheets

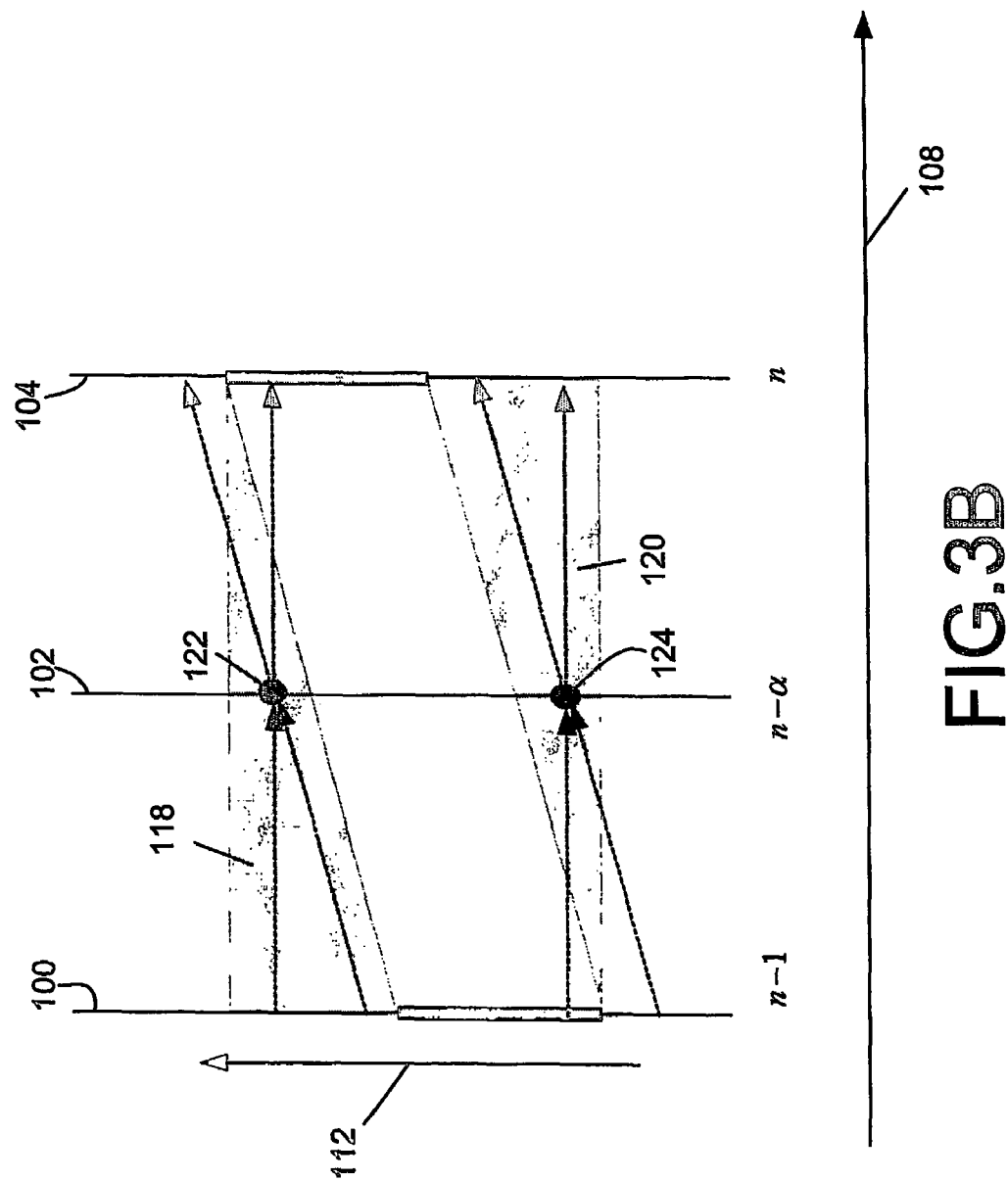

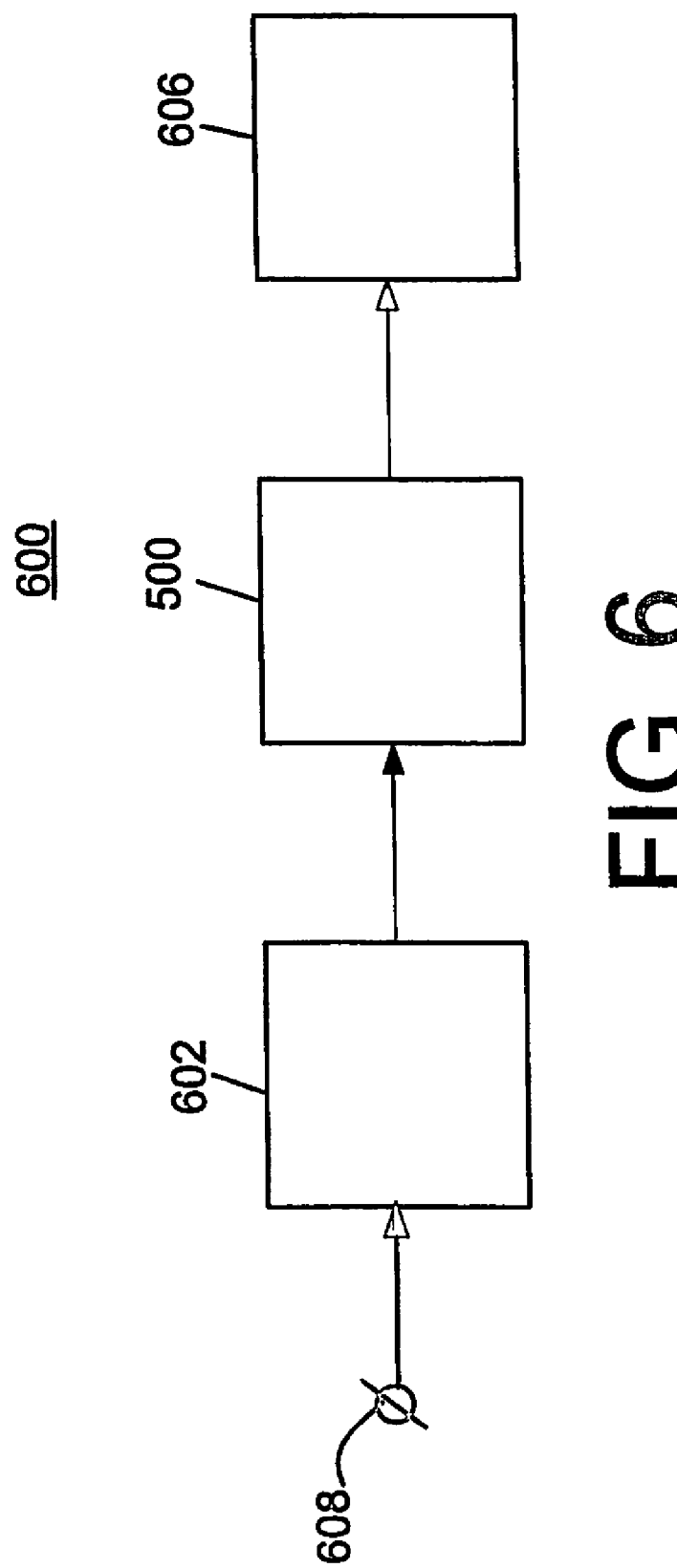

BACKGROUND MOTION VECTOR DETECTION

Figure 1:
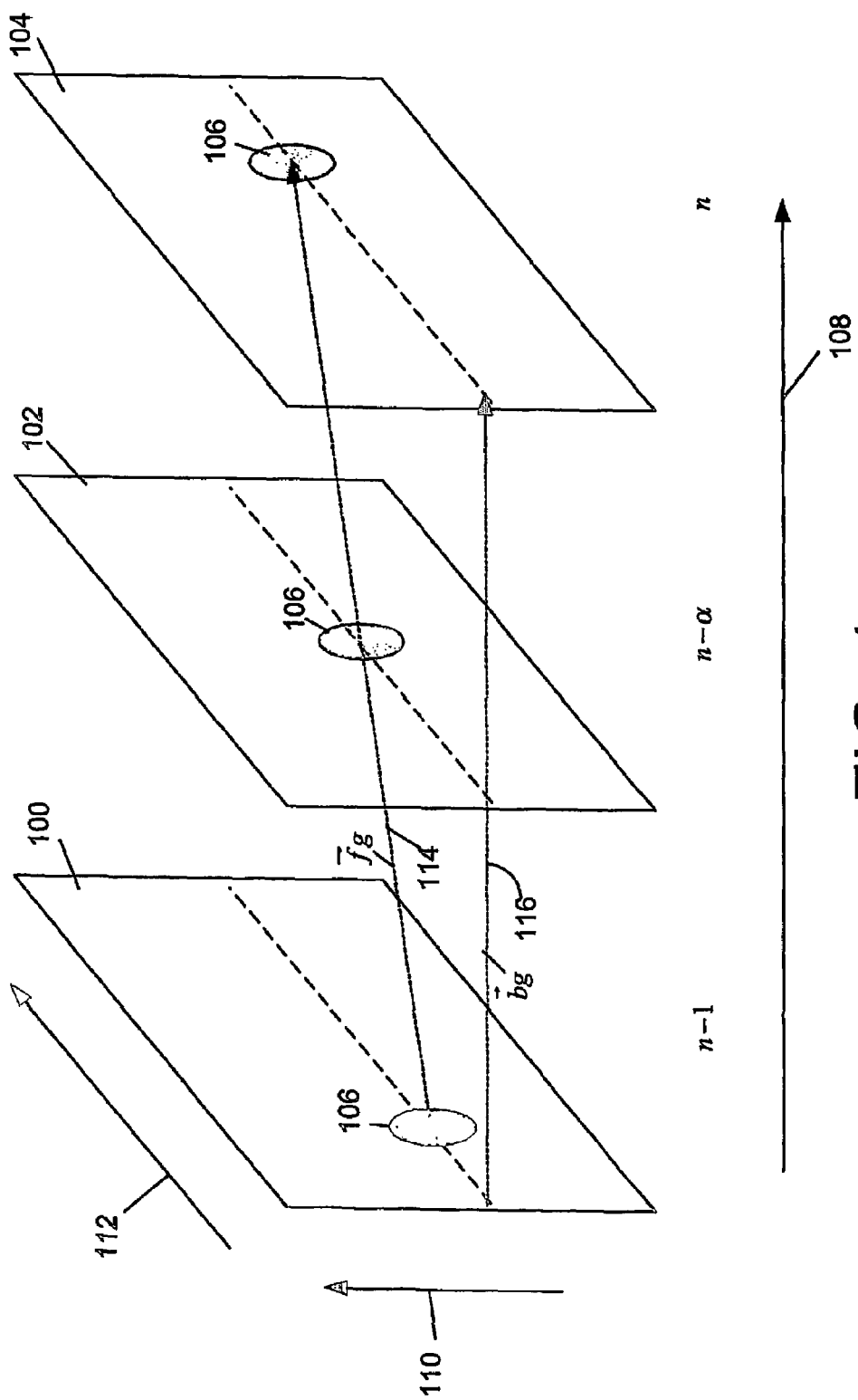

The invention relates to a selector for selecting a background motion vector for a pixel in an occlusion region of an image, from a set of motion vectors being computed for the image.

The invention further relates to an up-conversion unit for computing a pixel value in an occlusion region of an output image, on basis of a sequence of input images, the up-conversion unit comprising:
 a motion estimation unit for estimating motion vectors of the image, the motion vectors forming a motion vector field;
 a detection unit for detecting the occlusion region in the image, on basis of the motion vectors;
 a motion model determination unit for determining a motion model on basis of a part of the motion vector field;
 an interpolating unit for computing the pixel value by means of temporal interpolation, on basis of a background motion vector; and
 the selector for selecting the background motion vector for the pixel, as described above.

The invention further relates to an image processing apparatus comprising:
 receiving means for receiving a signal corresponding to a sequence of input images; and
 an up-conversion unit as described above.

The invention further relates to a method of selecting a background motion vector for a pixel in an occlusion region of an image, from a set of motion vectors being computed for the image.

The invention further relates a computer program product to be loaded by a computer arrangement, comprising instructions to select a background motion vector for a pixel in an occlusion region of an image, from a set of motion vectors being computed for the image.

In images resulting from motion compensated image rate converters, artifacts are visible at the boundaries of moving objects, where either covering or uncovering of background occurs. These artifacts are usually referred to as halos. There are two reasons for these halos. The first, rather trivial, cause is the resolution of the motion vector field. Usually, the density of the grid at which the motion vectors are available is much less than that of the pixel grid. If, for example, motion vectors are available for blocks of 8×8 pixels then the contours of moving objects can only roughly be approximated at the vector grid, resulting in a blocky halo effect. A second, less trivial cause, is that a motion estimation unit, estimating motion between two successive images of a video sequence, cannot perform well in regions where covering or uncovering occurs, as it is typical for these regions that the background information only occurs in either of the two images.

Moreover, up-conversion units usually combine information from both images, i.e. bi-directional interpolation, using the wrongly estimated motion vectors, to create the up-converted image. Since, one of these images does not contain the correct information, due to the occlusion, the up-converted image is incorrect for occlusion regions.

In order to solve these problems, an up-conversion unit should be able to detect the occlusion regions, detect the type of occlusion present in these regions (i.e. covering or uncovering), determine the correct motion vectors for these regions, and perform the up-conversion. The book "Video processing for multimedia systems", by G. de Haan, University Press Eindhoven, 2000, ISBN 90-9014015-8, chapter 4, describes methods for the detection of occlusion regions and for the covering/uncovering classification. So, remains the requirement for determining the correct motion vector in occlusion regions.

It is an object of the invention to provide a selector for easily determining an appropriate motion vector in an occlusion region.

This object of the invention is achieved in that the selector comprises:
 computing means for computing a model-based motion vector for the pixel on basis of a motion model being determined on basis of a part of a motion vector field of the image;
 comparing means for comparing the model-based motion vector with each of the motion vectors of the set of motion vectors; and
 selecting means for selecting a particular motion vector of the set of motion vectors on basis of the comparing and for assigning the particular motion vector as the background motion vector.

Typically, the set of motion vectors being computed for the occlusion region comprises a motion vector which corresponds with the movement of the foreground, i.e. the foreground motion vector and a motion vector which corresponds with the movement of the background, i.e. the background motion vector. However it is not directly known which one of the motion vectors of the set corresponds to the background. This background motion vector might correspond to the null vector, i.e. no motion. However, it is to be noticed that in many cases the camera is moving to track the main subject of the scene. That means that the foreground motion vector corresponds to the null vector and the background motion vector is not equal to the null vector.

To select the background motion vector from the set of motion vectors, use is made of a global motion model of the background of the image. Based on the model a model-based motion vector is determined for the particular pixel. The motion vectors of the set are compared with the model-based motion vector. The one which fits best is selected as the background motion vector.

Preferably the global motion model is based on motion vectors of the borders of the motion vector field. In other words, the part of the motion vector field which is applied for determining the motion model corresponds with motion vectors being estimated for groups of pixels in the neighborhood of the borders of the image. The probability that these motion vectors correspond with the background is relatively high.

In an embodiment of the selector according to the invention, the comparing unit is arranged to compute differences between the model-based motion vector and the respective motion vectors of the set of motion vectors and the selecting unit is arranged to select the particular motion vector if the corresponding difference is the minimum difference of the differences. The difference might be a $L_1$-norm, i.e. the sum of absolute differences of the components of the motion vectors to be compared. Alternatively, the difference is a $L_2$-norm, i.e. the sum of squared differences of the components of the motion vectors to be compared.

In an embodiment of the selector according to the invention, the motion model comprises translation and zoom. The parameters of such a model are relatively easy to compute, while the model is robust. With such a pan-zoom model the most frequent geometrical operations within video images can be described. With this pan-zoom model, the model-based motion vector $\vec{D}_b$ for a particular pixel can be determined by:

$$\vec{D}_b = \begin{bmatrix} t_x + z_x x \\ t_y + z_y y \end{bmatrix} \quad (1)$$

where $t_x$ and $t_y$ define the translation, $z_x$ and $z_y$ define the zoom and x and y the location in the image. In U.S. Pat. No. 6,278,736 and in the article "An efficient true-motion estimator using candidate vectors from a parametric motion model", by G. de Haan, et al., in IEEE Transactions on circuits and systems for video technology, Vol. 8, no. 1, pages 85-91, March 1998 is described how a motion model can be made based on a part of a motion vector field.

It is a further object of the invention to provide an up-conversion unit of the kind described in the opening paragraph comprising a selector for easily determining an appropriate motion vector in an occlusion region.

This object of the invention is achieved in that the selector for selecting the background motion vector for the pixel is as claimed in claim 1.

It is a further object of the invention to provide an image processing apparatus of the kind described in the opening paragraph comprising a selector for easily determining an appropriate motion vector in an occlusion region.

This object of the invention is achieved in that the selector for selecting the background motion vector for the pixel is as claimed in claim 1.

The image processing apparatus may comprise additional components, e.g. a display device for displaying the output images. The image processing apparatus might support one or more of the following types of image processing:

Video compression, i.e. encoding or decoding, e.g. according to the MPEG standard.
  De-interlacing: Interlacing is the common video broadcast procedure for transmitting the odd or even numbered image lines alternately. De-interlacing attempts to restore the full vertical resolution, i.e. make odd and even lines available simultaneously for each image;
  Image rate conversion: From a series of original input images a larger series of output images is calculated. Output images are temporally located between two original input images; and
  Temporal noise reduction. This can also involve spatial processing, resulting in spatial-temporal noise reduction.

The image processing apparatus might e.g. be a TV, a set top box, a VCR (Video Cassette Recorder) player, a satellite tuner, a DVD (Digital Versatile Disk) player or recorder.

It is a further object of the invention to provide a method for easily determining an appropriate motion vector in an occlusion region.

This object of the invention is achieved in that the method comprises:

computing a model-based motion vector for the pixel on basis of a motion model being determined on basis of a part of a motion vector field of the image;
  comparing the model-based motion vector with each of the motion vectors of the set of motion vectors;
  selecting a particular motion vector of the set of motion vectors on basis of the comparing and for assigning the particular motion vector as the background motion vector.

It is a further object of the invention to provide a computer program product of the kind described in the opening paragraph for easily determining an appropriate motion vector in an occlusion region.

This object of the invention is achieved in that the computer program product, after being loaded, provides processing means with the capability to carry out:

computing a model-based motion vector for the pixel on basis of a motion model being determined on basis of a part of a motion vector field of the image;
  comparing the model-based motion vector with each of the motion vectors of the set of motion vectors;
  selecting a particular motion vector of the set of motion vectors on basis of the comparing and for assigning the particular motion vector as the background motion vector.

Modifications of the selector and variations thereof may correspond to modifications and variations thereof of the method, the up-conversion unit, the image processing apparatus and the computer program product described.

Figure 2:
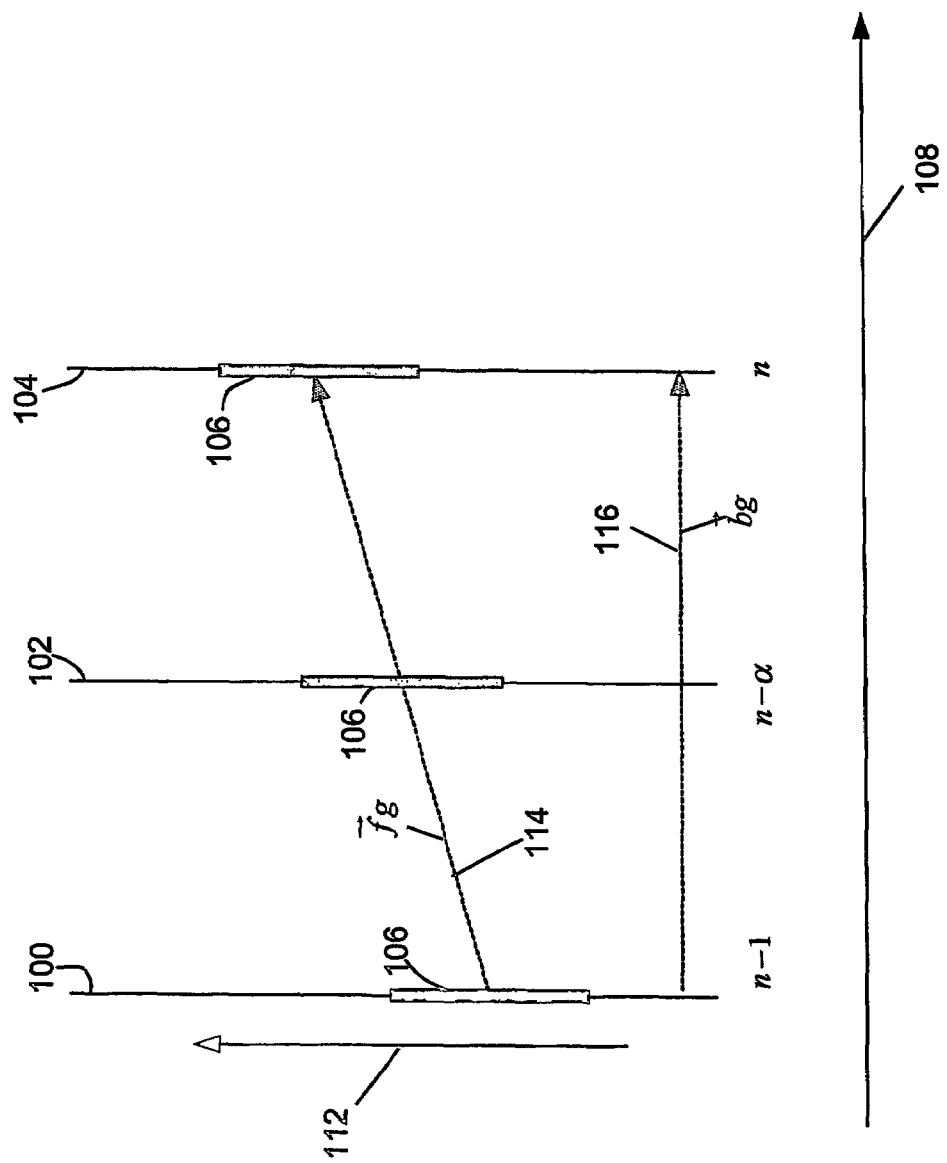
Figure 3A:
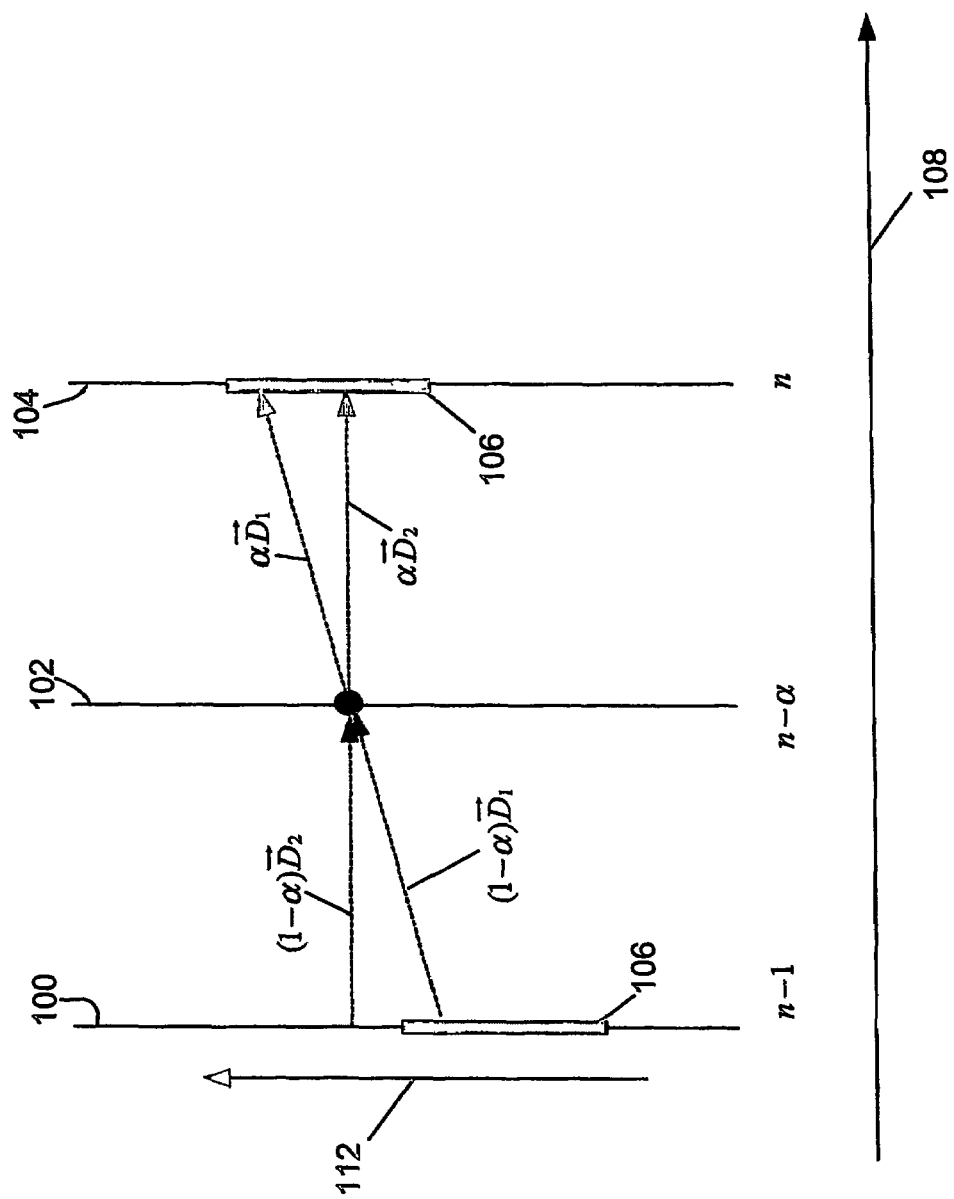
Figure 4:
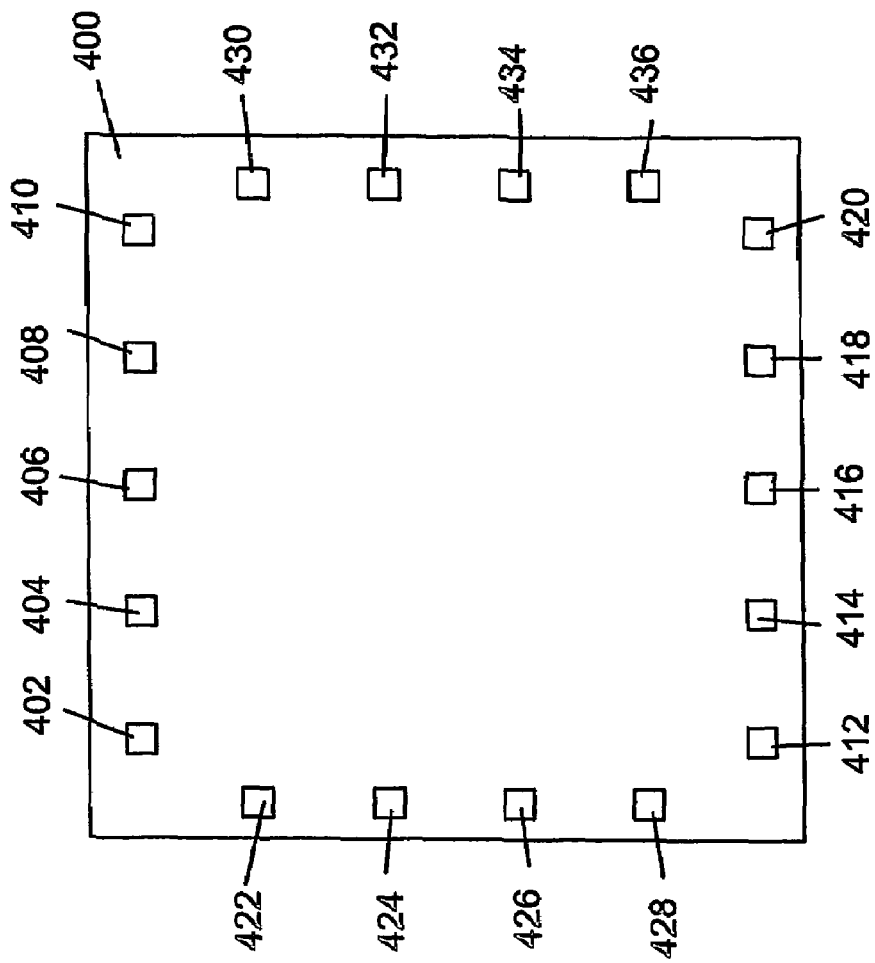
Figure 5:
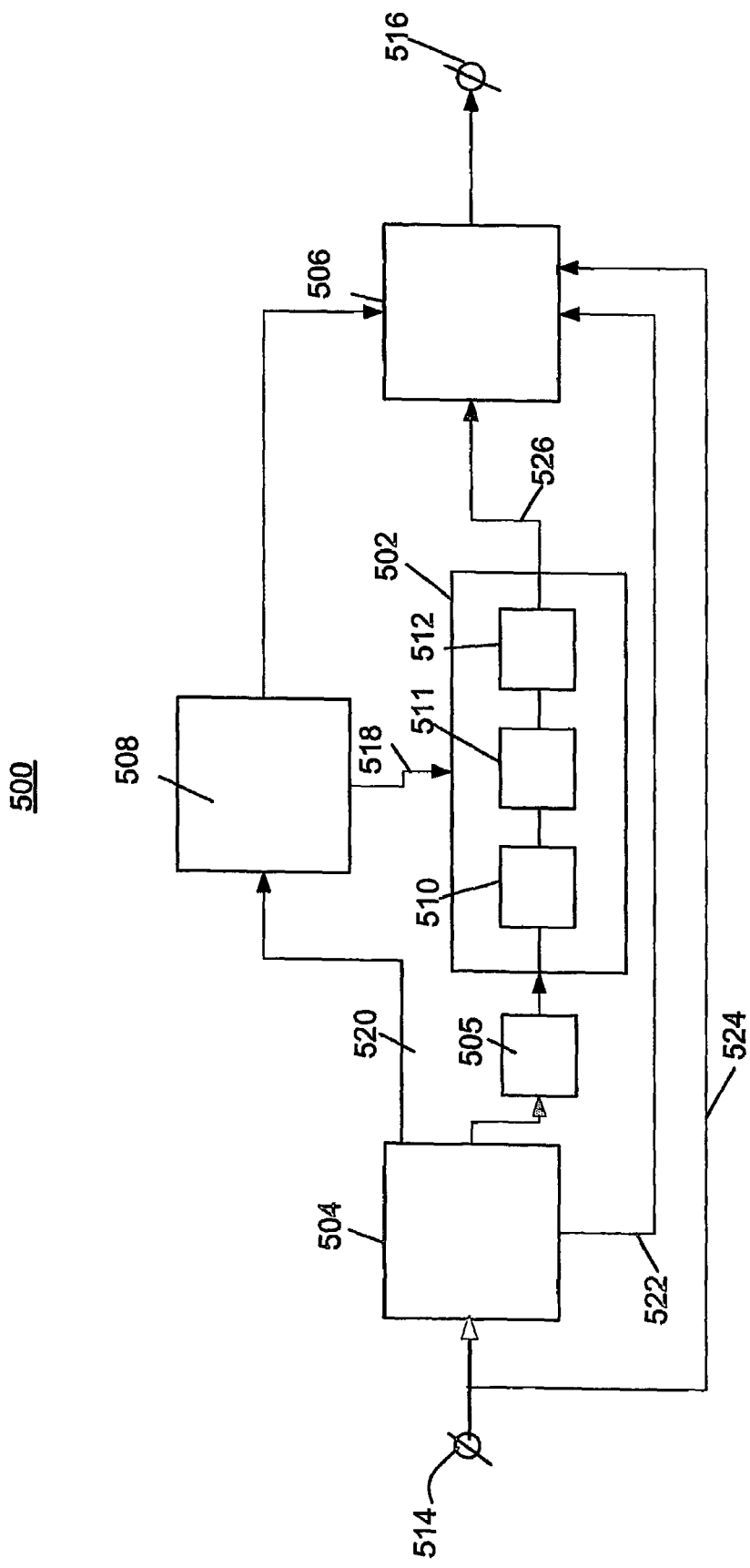

These and other aspects of the selector, of the method, the up-conversion unit, the image processing apparatus and of the computer program product according to the invention will become apparent from and will be elucidated with respect to the implementations and embodiments described hereinafter and with reference to the accompanying drawings, wherein:

FIG. 1 schematically shows an image sequence containing a moving ball;

FIG. 2 schematically shows a 2-D representation of the situation depicted in FIG. 1;

FIG. 3A and FIG. 3B schematically show bi-directional matches used in prior art motion estimation;

FIG. 4 schematically shows which part of a motion vector field is used to determine a motion model according to the invention;

FIG. 5 schematically shows an up-conversion unit according to the invention; and FIG. 6 schematically shows an embodiment of the image processing apparatus according to the invention.

Same reference numerals are used to denote similar parts throughout the figures.

Consider the situation in FIG. 1. Two successive original, i.e. input, images 100 and 104 are given at a first point in time n−1 and a second point in time n, respectively. These images 100 and 104 schematically show a ball 106 moving from left to right. An intermediate image 102 is created at n−a with 0<a<1. This intermediate image 102 is constructed from both original images 100 and 104. The quantity time corresponds with the axis 108. The vertical co-ordinates correspond with the axis 110 and the horizontal co-ordinates correspond with the axis 112. It is assumed that the ball has a velocity of $\vec{f}g$ and that the background is stationary, i.e. $\vec{b}g = \vec{0}$.

FIG. 2 schematically shows a 2-D representation of the situation depicted in FIG. 1. Note that FIG. 2 is rotated with respect to FIG. 1. Only the temporal 108 and the horizontal 112 axes are shown. The ball 106 is now represented by the Grey rectangle. The motion trajectories of the ball 106 and of the background are indicated by the arrows 114 and 116, respectively. The output image 102 image at n−a is created by motion compensated interpolation, using motion vectors estimated to be valid at n−a. The problems in the motion estimation unit and interpolator according to the prior art, causing the halo, will be discussed below.

In general, a motion estimation unit determines a motion vector for a group of pixels by selecting the best matching motion vector from a set of candidate motion vectors. The match error is usually a Sum of Absolute Differences (SAD) obtained by fetching pixels from the input image at n−1 and comparing those pixels with pixels fetched from the input image at n, using the candidate motion vector, i.e.:

$$\varepsilon(\vec{D}, \vec{X}, n) = \sum_{\vec{x} \in B(\vec{X})} |F(\vec{x} - (1-\alpha)\vec{D}, n-1) - F(\vec{x} + \alpha\vec{D}, n)| \quad (2)$$

here $\vec{D}$ is the motion vector, $B(\vec{X})$ is the block located at block position $\vec{X}$, $\vec{x}$ is a pixel position, $F(\vec{x}, n)$ is a luminance frame, n is the image number and a is a relative position. An example is given in FIG. 3A. The motion vector $\vec{D}_1$ points to the same information in both images, hence it has a low match error. The motion vector $\vec{D}_2$ points to information in image 100 at time n−1 which differs from the information in image 104 at time n. A high match error is the result.

A problem occurs in occlusion areas. In these areas no motion vector can result in a correct match since the information is not present in one of the two frames. In case of uncovering new information appears and is therefore not present in image 100 at time n−1. In case of covering information disappears and is therefore not present in image 104 at time n. The result of this is that the motion vector field is erroneous in occlusion areas. FIG. 3B shows these problem areas 118 and 120 in Grey. The black dots 122 and 124 represent pixels for which a motion vector has to be estimated. The black dots 122 and 124 are located in the background, but since the background is covered in either image 100 at time n−1 or image 104 at time n there is no motion vector which describes the motion of these image parts.

In known up-conversion units, usually pixel value information from both images, F(n) and F(n−1), is used for interpolation. For example, motion compensated averaging uses a motion compensated pixel from the image 100 at time n−1 and a motion compensated pixel from the image 104 at time n:

$$F(\vec{x}, n - \alpha) = \frac{F(\vec{x} - (1-\alpha)\vec{D}, n-1) + F(\vec{x} + \alpha\vec{D}, n)}{2} \quad (3)$$

Even if the correct motion vector is used, the result in occlusion areas is erroneous since either the pixel from the image 100 at time n−1 or from the image 104 at time n is wrong.

A solution to the halo problem comprises at least two actions. Firstly, adjust the probably wrong motion vector in occlusion regions such that the correct motion vector is used in the up-conversion. Secondly, using the correct motion vector, fetch the pixel value information from the correct image, i.e. use unidirectional fetches instead of bi-directional fetches.

There are some difficulties however. In order to perform the first action it must be known where the occlusion areas are. Hence occlusion detection and foreground/background motion detection is required.

In order to perform the second action it must be known what type of occlusion there is. If it is covering, then the pixel value information from the image at time n−1 must be fetched. If it is uncovering, then the pixel value information from the image at time n must be fetched. Hence covering/uncovering detection is required. The book "Video processing for multimedia systems", by G. de Haan, University Press Eindhoven, 2000, ISBN 90-9014015-8, chapter 4, describes methods for the detection of occlusion regions and for the covering/uncovering classification.

In the following the foreground/background motion detection according to the invention is described. FIG. 4 schematically shows which part of a motion vector field 400 is used to determine a global motion model of the background, according to the invention. It is assumed that the background motion is present at the borders of the image. Hence, a number of motion vectors belonging to blocks of pixels located at the border of the image, i.e. at the border of motion vector field are used to determine the motion model of the background of the image. The method to determine a motion model is described in detail in patent specification U.S. Pat. No. 6,278,736 and in the article "An efficient true-motion estimator using candidate vectors from a parametric motion model", by G. de Haan, et al., in IEEE Transactions on circuits and systems for video technology, Vol. 8, no. 1, pages 85-91, March 1998. This method determines a pan-zoom model from the motion vector of pairs of blocks and takes the component-wise median as the global pan-zoom model. A difference between the approach according to the invention and the one mentioned in the cited article is the choice of the blocks. In the approach according to the invention blocks from the borders of the image are used. Preferably 5 blocks 402-410 from the top, 5 blocks 412-420 from the bottom border, 4 blocks 422-428 from the left and 4 blocks 430-436 from the right border are used. That means a total of 18 blocks. With this pan-zoom model, the model-based motion vector $\vec{D}_b$ for a particular pixel can be determined by means of Equation 1.

In order to determine the background motion vector of a location $\vec{x}$, in an occlusion region a set of motion vectors being determined by the motion estimation unit are required. Typically this set of motion vector comprises two motion vectors. The first one is the one which has been estimated for the location $\vec{x}$ by the motion estimation unit 502: $\vec{D}_c = \vec{D}(\vec{x})$ and an alternative motion vector in a motion vector being determined for a location $\vec{x} + \delta$ in the neighborhood, $\vec{D}_a = \vec{D}(\vec{x} + \delta)$. In general, one of these motion vectors corresponds to the foreground motion vector and the other corresponds to the background motion vector. In order to determine the alternative motion vector $\vec{D}_a$, motion vectors from locations a number of pixels (typically δ=16) to the left $\vec{D}_l$ and right $\vec{D}_r$ of the current position are evaluated. The motion vector being most different from the current vector is selected as the alternative motion vector $\vec{D}_a$.

$$\vec{D}_l = \vec{D}(\vec{x} - (16, 0)) \quad (4)$$
$$\vec{D}_r = \vec{D}(\vec{x} + (16, 0))$$

$$\vec{D}_a = \begin{cases} \vec{D}_l & \text{if } |\vec{D}_l - \vec{D}_c| < |\vec{D}_r - \vec{D}_c| \\ \vec{D}_r & \text{if } |\vec{D}_l - \vec{D}_c| < |\vec{D}_r - \vec{D}_c| \end{cases} \quad (5)$$

where $\vec{D}(\vec{x})$ is the vector field. (See also U.S. Pat. No. 5,777,682)

In order to classify the motion vectors $\vec{D}_c$ and $\vec{D}_a$ into foreground and background these motion vectors are compared with the motion vector which is computed on basis of the motion model for the background of the image, $\vec{D}_b$. The actual background vector is the motion vector which has the minimal distance to $\vec{D}_b$, i.e.:

$$\text{If } |\vec{D}_c - \vec{D}_b| < |\vec{D}_a - \vec{D}_b| \Rightarrow \vec{b}g = \vec{D}_c \text{ and } \vec{f}g = \vec{D}_a \qquad (6)$$

$$\text{If } |\vec{D}_c - \vec{D}_b| \geq |\vec{D}_a - \vec{D}_b| \Rightarrow \vec{b}g = \vec{D}_a \text{ and } \vec{f}g = \vec{D}_c \qquad (7)$$

FIG. 5 schematically shows an up-conversion unit 500 according to the invention. The up-conversion unit is arranged to compute a pixel value in an occlusion region of an output image, on basis of a sequence of input images. The up-conversion unit comprises:
- a motion estimation unit 504 for estimating motion vectors of the image. The motion vectors form a motion vector field. The motion estimation unit is e.g. as specified in the article "True-Motion Estimation with 3-D Recursive Search Block Matching" by G. de Haan et. al. in IEEE Transactions on circuits and systems for video technology, vol. 3, no. 5, October 1993, pages 368-379;
- a detection unit 508 for detecting the occlusion regions in the image, on basis of the motion vectors. This detection unit 508 is specified in more detail in the book "Video processing for multimedia systems", by G. de Haan, University Press Eindhoven, 2000, ISBN 90-9014015-8, chapter 4;
- a motion model determination unit 505 for determining a motion model on basis of a part of the motion vector field. This motion model determination unit 505 is as described in connection with FIG. 4;
- an interpolating unit 506 for computing the pixel value of the output image 102 by means of temporal interpolation, on basis of a background motion vector; and
- a selector 502 for selecting the background motion vector for the pixel, as described above. This selector comprises:
  - a motion vector computing unit 510 for computing a model-based motion vector $\vec{D}_b$ for the pixel on basis of a motion model being determined on basis of a part 402-436 of a motion vector field 400 of the image;
  - a comparing unit 511 for comparing the model-based motion vector $\vec{D}_b$ with each of the motion vectors $\vec{D}_c$ and $\vec{D}_a$ of the set of motion vectors;
  - a selector unit 512 for selecting a particular motion vector of the set of motion vectors on basis of the comparing and for assigning the particular motion vector as the background motion vector.

The motion estimation unit 504, the detection unit 508, the motion model determination unit 505, the interpolating unit 506, and the selector 502 may be implemented using one processor. Normally, these functions are performed under control of a software program product. During execution, normally the software program product is loaded into a memory, like a RAM, and executed from there. The program may be loaded from a background memory, like a ROM, hard disk, or magnetically and/or optical storage, or may be loaded via a network like Internet. Optionally an application specific integrated circuit provides the disclosed functionality.

The working of the up-conversion unit 500 is as follows. On the input connector 514 a signal representing a series of input images 100 and 104 is provided. The up-conversion unit 500 is arranged to provide a series of output images at the output connector 516, comprising the input images 100 and 104 and intermediate images, e.g. 102. The motion estimation unit 504 is arranged to compute a motion vector field 400 for the intermediate image on basis of the input images 100 and 104. On basis of the pixel values 524 of the input images 100 and 104 and on basis of the motion vectors 522 the interpolating unit 506 is arranged to compute the pixel values of the intermediate image 102. In principle this is done by means of a bi-directional fetch of pixel values. However, as explained above, this results in artifacts in occlusion regions. Because of that, the up-conversion unit 500 according to the invention is arranged to perform an alternative interpolation for these occlusion regions.

The up-conversion unit 500 comprises a detection unit 508 for detecting the occlusion regions in the image and for control of the interpolating unit 506. The detection unit 508 is arranged to classify the type of occlusion as described in patent application EP1048170. The classification is based on comparing neighboring motion vectors. The classification is as follows:

$$\text{occlusion} = \begin{cases} \text{uncovering if } D_{l,x} < D_{r,x} \\ \text{covering if } D_{l,x} > D_{r,x} \end{cases} \qquad (8)$$

with $D_{l,x}$ the x-component of the left motion vector and $D_{r,x}$ the x-component of the right motion vector to be compared. The detection unit 508 provides the selector 502 with a set of motion vectors 518. Typically this set of motion vectors comprises two motion vectors. The selector 502 is arranged to determine which of these motion vectors corresponds to the background motion and which of these motion vectors corresponds with the foreground motion. On basis of the background motion vector 526 the interpolation unit 506 is arranged to fetch the corresponding pixel value in the appropriate image:
- in the case of covering the background motion vector is applied to fetch the pixel value in image at time n−1; and
- in the case of uncovering the background motion vector is applied to fetch the pixel value in image at time n;

Optionally additional pixel values are fetched in both preceding and succeeding images on basis of an other motion vector. By means of a filtering operation, e.g. an order statistical operation like a median, the eventual pixel value of the intermediate image is computed.

In summary the halo reduction is as follows. The halo reduction starts by determining the occlusion regions. Only in the occlusion regions the upconversion deviates from the "normal" upconversion, motion compensated averaging, as specified in Equation 3. In occlusion regions the motion vector field is inaccurate. Therefore, it is tested whether or not an alternative motion vector $\vec{D}_a$ is better than the one $\vec{D}_c$ which has been estimated by the motion estimation unit 504 for the current pixel. These two motion vectors, the current $\vec{D}_c$ and alternate $\vec{D}_a$ motion vector are provided to the selector 502 which is arranged to determine the background motion vector. With the appropriate motion vector the appropriate pixel value is fetched from the preceding or succeeding image.

FIG. 6 schematically shows an embodiment of the image processing apparatus 600 according to the invention, comprising:

Receiving means 602 for receiving a signal representing input images. The signal may be a broadcast signal received via an antenna or cable but may also be a signal from a storage device like a VCR (Video Cassette Recorder) or Digital Versatile Disk (DVD). The signal is provided at the input connector 608;

The up-conversion unit 500 as described in connection with FIG. 5; and

A display device 606 for displaying the output images of the up-conversion unit 500.

The image processing apparatus 600 might e.g. be a TV. Alternatively the image processing apparatus 600 does not comprise the optional display device 606 but provides the output images to an apparatus that does comprise a display device 606. Then the image processing apparatus 600 might be e.g. a set top box, a satellite-tuner, a VCR player, a DVD player or recorder. Optionally the image processing apparatus 600 comprises storage means, like a hard-disk or means for storage on removable media, e.g. optical disks. The image processing apparatus 600 might also be a system being applied by a film-studio or broadcaster.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware.

The invention claimed is:

1. A selector (502) for selecting a background motion vector for a pixel in an occlusion region of an image, from a set of motion vectors being computed for the image, the selector (502) comprising:
   computing means (510) for computing a model-based motion vector for the pixel on the basis of a motion model being determined on basis of a part of (402-436) a motion vector field (400) of the image;
   comparing means (511) for comparing the model-based motion vector with each of the motion vectors of the set of motion vectors; and
   selecting means (512) for selecting a particular motion vector of the set of motion vectors on basis of the comparing and for assigning the particular motion vector as the background motion vector.

2. A selector (502) as claimed in claim 1, wherein the part of the motion vector field (400) corresponds with motion vectors being estimated for groups of pixels in the neighborhood of the borders of the image.

3. A selector (502) as claimed in claim 1, wherein the comparing unit is arranged to compute differences between the model-based motion vector and the respective motion vectors of the set of motion vectors and the selecting unit is arranged to select the particular motion vector if the corresponding difference is the minimum difference of the differences.

4. A selector (502) as claimed in claim 1, wherein the motion model comprises translation and zoom.

5. An up-conversion unit (500) for computing a pixel value in an occlusion region of an output image, on basis of a sequence of input images, the up-conversion unit (500) comprising:
   a motion estimation unit (504) for estimating motion vectors of the image, the motion vectors forming a motion vector field (400);
   a detection unit (508) for detecting the occlusion region in the image, on the basis of the motion vectors;
   a motion model determination unit (505) for determining a motion model on basis of part of (402-436) the motion vector field (400);
   an interpolating unit (506) for computing the pixel value by means of temporal interpolation, on basis of a background motion vector; and
   a selector (502) for selecting the background motion vector for the pixel, said selector comprising;
   a processor for computing a model-based motion vector for the pixel on the basis of motion model being determined on basis of a part of a motion vector field of the image;
   a comparison stage for comparing the model-based motion vector with each of the motion vectors of the set of motion vectors; and
   a selection stage for selecting a particular motion vector of the set of motion vectors on basis of the comparing and for assigning the particular motion vector as the background motion vector.

6. A method of selecting a background motion vector for a pixel in an occlusion region of an image, from a set of motion vectors being computed for the image, the method comprising: using a processor to perform the steps of:
   computing a model-based motion vector for the pixel on basis of a motion model being determined on basis of a part of (402-436) a motion vector field (400) of the image;
   comparing the model-based motion vector with each of the motion vectors of the set of motion vectors; and
   selecting a particular motion vector of the set of motion vectors on basis of the comparing and for assigning the particular motion vector as the background motion vector.

* * * * *